United States Patent
Park et al.

(10) Patent No.: US 12,214,376 B2
(45) Date of Patent: Feb. 4, 2025

(54) CHOKE BAR SLOT DIE AND SLURRY COATING APPARATUS INCLUDING THE SAME

(71) Applicant: LG Chem, Ltd., Seoul (KR)

(72) Inventors: Joon Sun Park, Daejeon (KR); Hyeong Geun Chae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 781 days.

(21) Appl. No.: 17/271,049

(22) PCT Filed: Jun. 24, 2020

(86) PCT No.: PCT/KR2020/008207
§ 371 (c)(1),
(2) Date: Feb. 24, 2021

(87) PCT Pub. No.: WO2021/054581
PCT Pub. Date: Mar. 25, 2021

(65) Prior Publication Data
US 2021/0387223 A1 Dec. 16, 2021

(30) Foreign Application Priority Data

Sep. 16, 2019 (KR) .......................... 10-2019-0113243

(51) Int. Cl.
*B05C 5/02* (2006.01)
*H01M 4/04* (2006.01)

(52) U.S. Cl.
CPC ......... *B05C 5/0262* (2013.01); *H01M 4/0404* (2013.01); *B05C 5/0258* (2013.01); *B05C 5/0266* (2013.01)

(58) Field of Classification Search
CPC ... B05C 5/0262; B05C 5/0258; B05C 5/0266; B05C 11/10; H01M 4/0404;
(Continued)

(56) References Cited

U.S. PATENT DOCUMENTS

| 3,241,183 A | 3/1966 | Tyrner |
| 6,423,144 B1 * | 7/2002 | Watanabe ............... B05C 5/002 |
| | | 118/410 |

(Continued)

FOREIGN PATENT DOCUMENTS

| CN | 1262355 C | 7/2006 |
| CN | 102553780 A | 7/2012 |

(Continued)

OTHER PUBLICATIONS

JP2011121346, Kenmochi, T-Die For Plastic Fabrication and Production Process of Laminated Material Using the Same, published Jun. 23, 2011. (Year: 2011).*

(Continued)

*Primary Examiner* — Dah-Wei D. Yuan
*Assistant Examiner* — Stephen A Kitt
(74) *Attorney, Agent, or Firm* — Lerner David LLP

(57) ABSTRACT

The present invention relates to a slot die with a structure in which a stripe shim and a cover shim are mounted between an upper body and a lower body, and a choke bar is inserted into a through path formed in the upper body, and an apparatus for coating an electrode slurry including the slot die. According to the present invention, by forming a space in which the choke bar can move by the cover shim, it is possible to adjust the flow rate of the slurry through the choke bar regardless of the shape of the stripe shim.

15 Claims, 7 Drawing Sheets

(58) Field of Classification Search
CPC ............... H01M 4/0409; B29C 48/154; B29C 48/2556; B29C 48/268; B29C 48/305; B29C 48/345; H05B 33/10; Y02E 60/10
USPC .................................................. 118/300, 410
See application file for complete search history.

(56) References Cited

U.S. PATENT DOCUMENTS

| | | |
|---|---|---|
| 9,522,411 B2 | 12/2016 | Harris et al. |
| 2004/0139913 A1 | 7/2004 | Kuromiya |
| 2008/0274223 A1 | 11/2008 | Cloeren |
| 2012/0315378 A1* | 12/2012 | Yapel ............ B05D 1/265 118/696 |
| 2014/0186530 A1 | 7/2014 | Harris et al. |
| 2019/0118449 A1 | 4/2019 | Greenlund et al. |
| 2020/0353500 A1 | 11/2020 | Kim et al. |

FOREIGN PATENT DOCUMENTS

| | | |
|---|---|---|
| EP | 1419827 A2 | 5/2004 |
| JP | 2005270704 A | 10/2005 |
| JP | 2007125503 A | 5/2007 |
| JP | 2010086811 A | 4/2010 |
| KR | 20080097905 A | 11/2008 |
| KR | 100946874 B1 | 3/2010 |
| KR | 20120106389 A | 9/2012 |
| KR | 101308251 B1 | 9/2013 |
| KR | 20160047388 A | 5/2016 |
| KR | 20160070482 A | 6/2016 |
| KR | 20160087574 A | 7/2016 |
| KR | 101762813 B1 | 7/2017 |
| KR | 101853680 B1 | 5/2018 |
| KR | 101922054 B1 | 11/2018 |
| KR | 20180120029 A | 11/2018 |
| WO | 2018199464 A1 | 11/2018 |

OTHER PUBLICATIONS

Extended European Search Report for Application No. 20859622.1, dated Oct. 15, 2021, 8 pages.
International Search Report for Application No. PCT/KR2020/008207, Dated Sep. 28, 2020, 3 pages.

* cited by examiner

[FIG. 1]
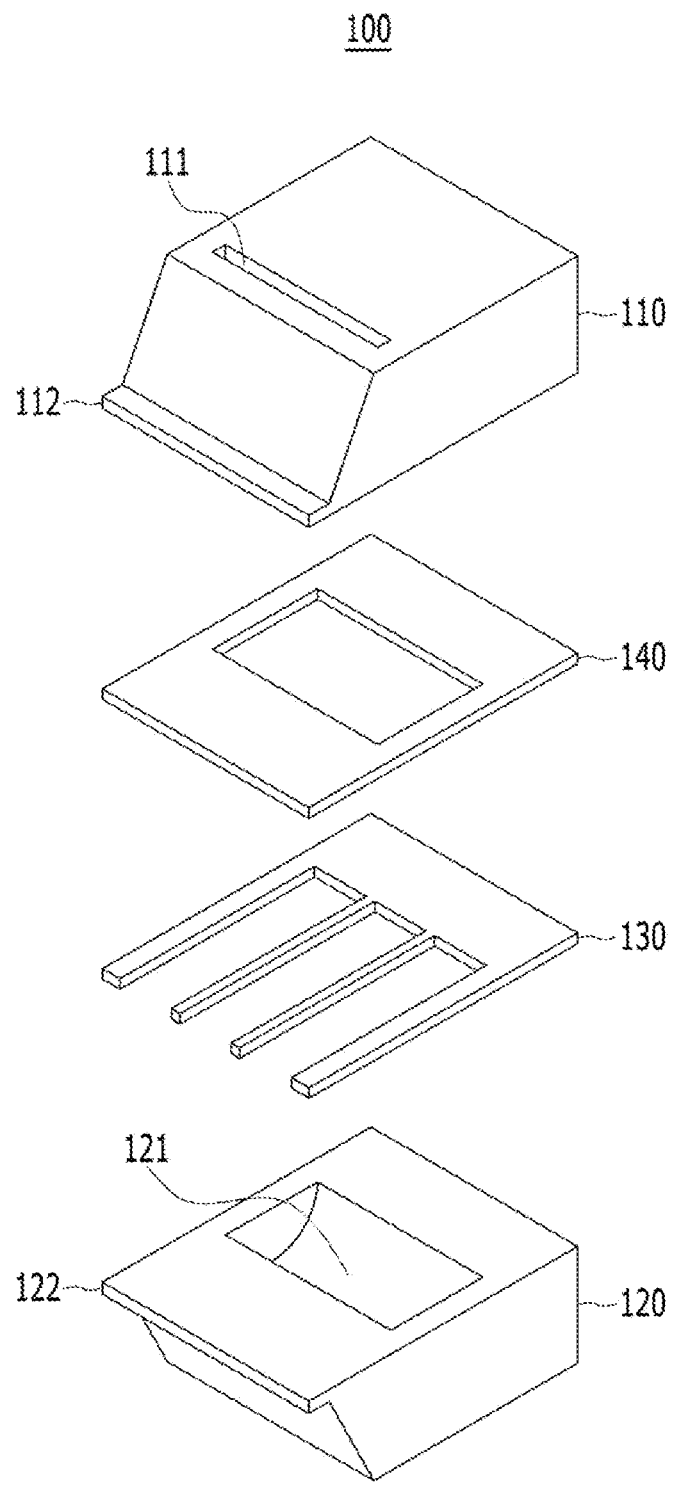

[FIG. 2]
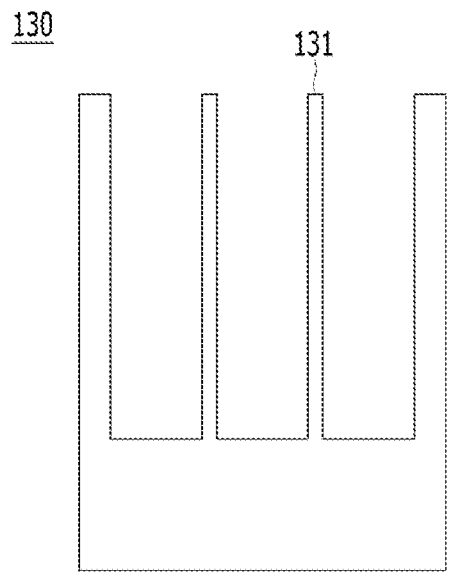
[FIG. 3]
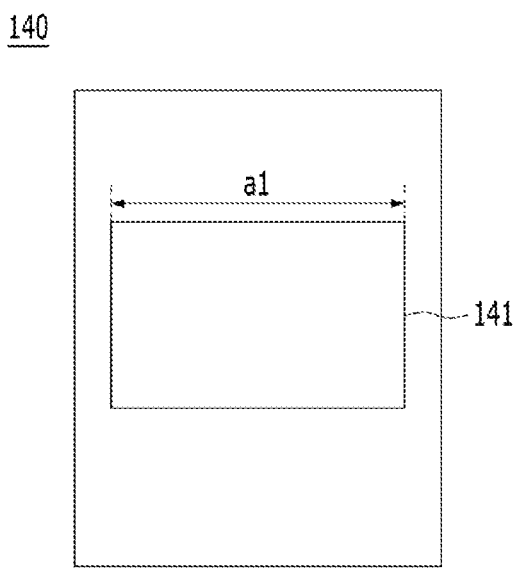

【FIG. 4】
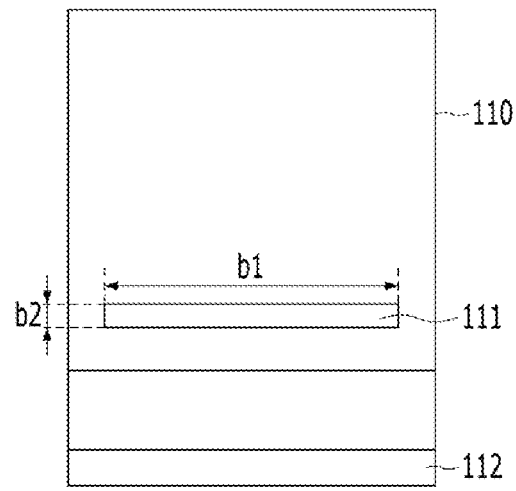
【FIG. 5】
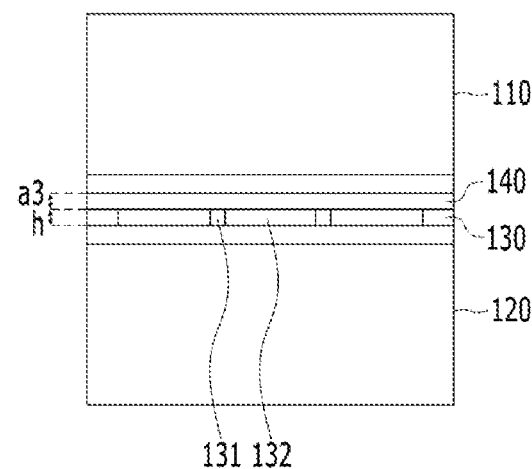

[FIG. 6]
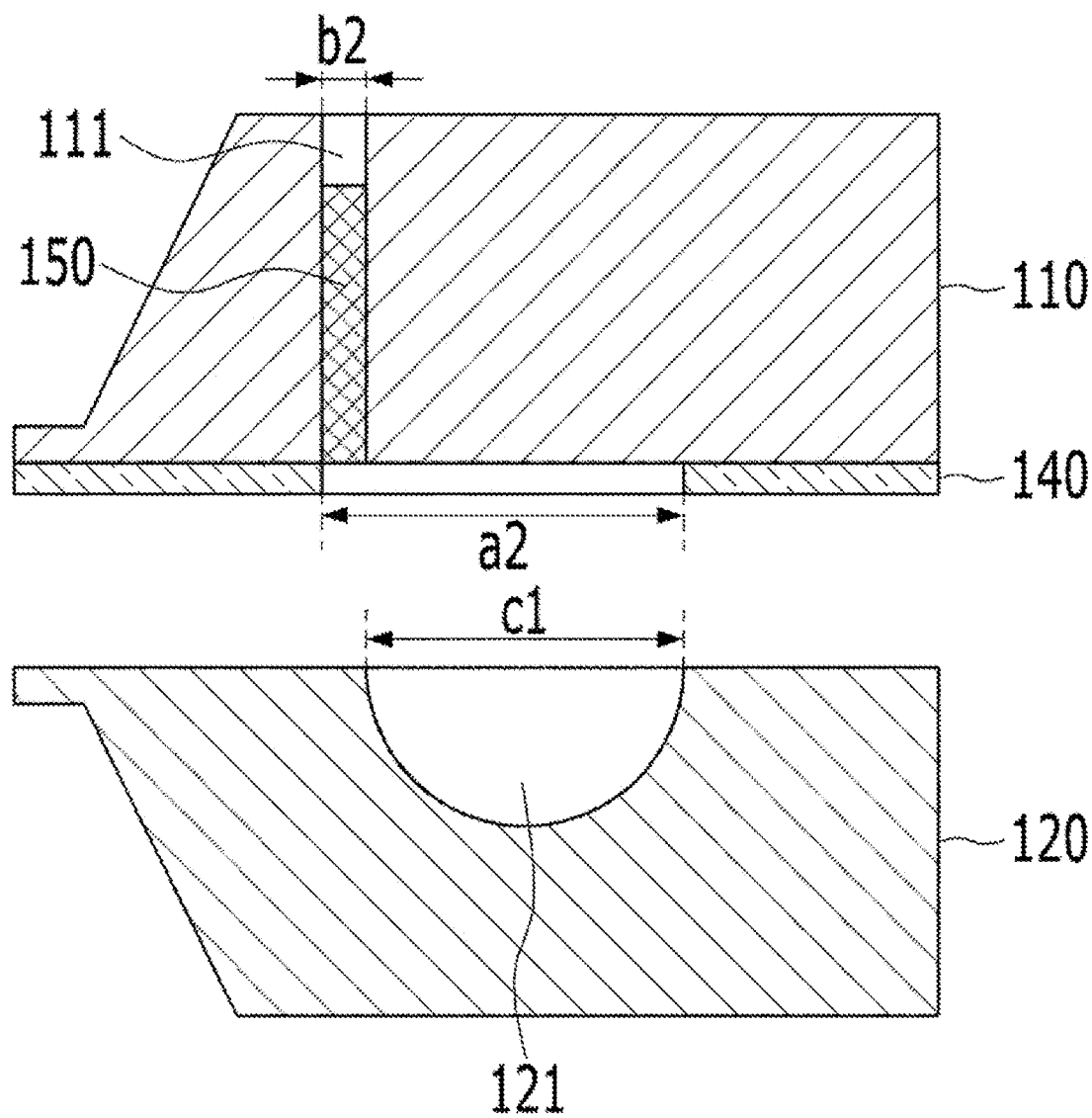

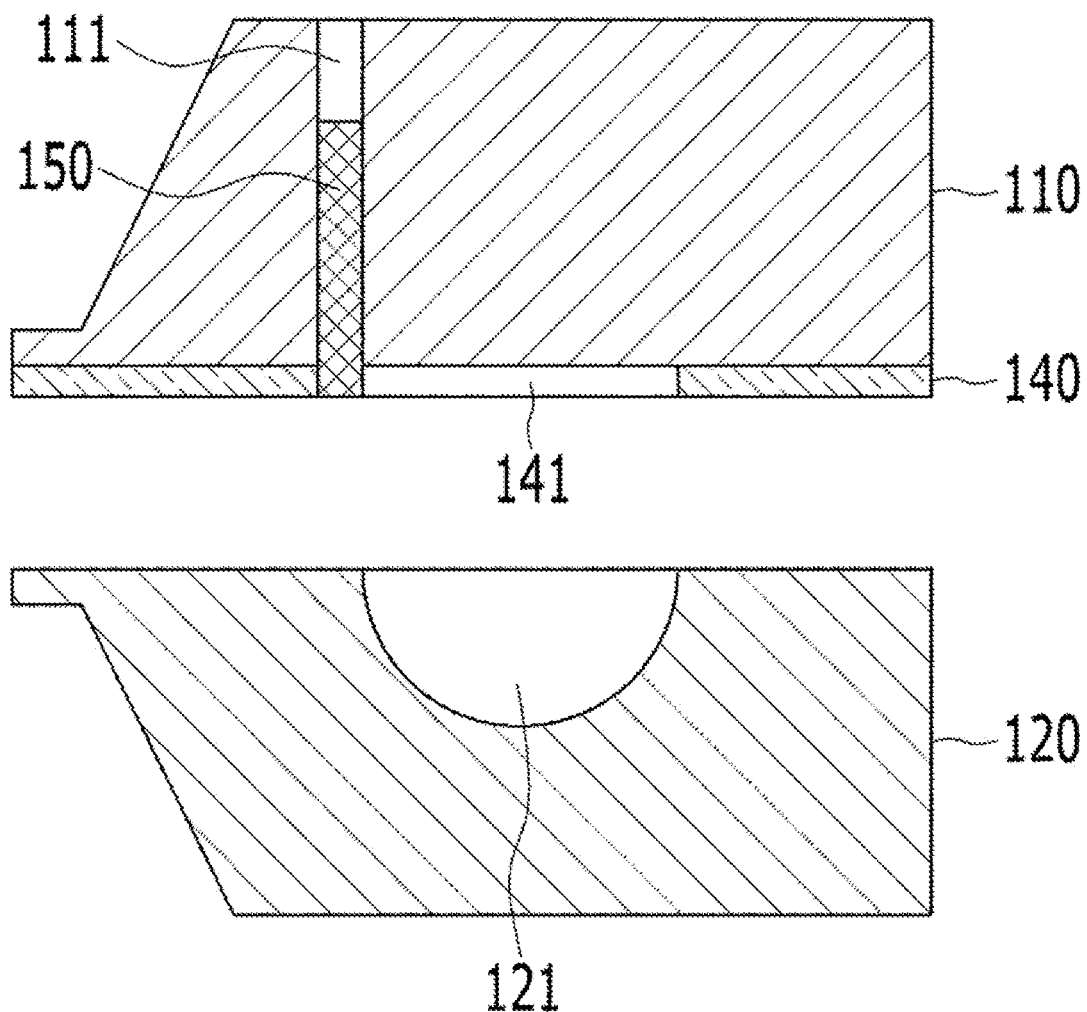

[FIG. 8]
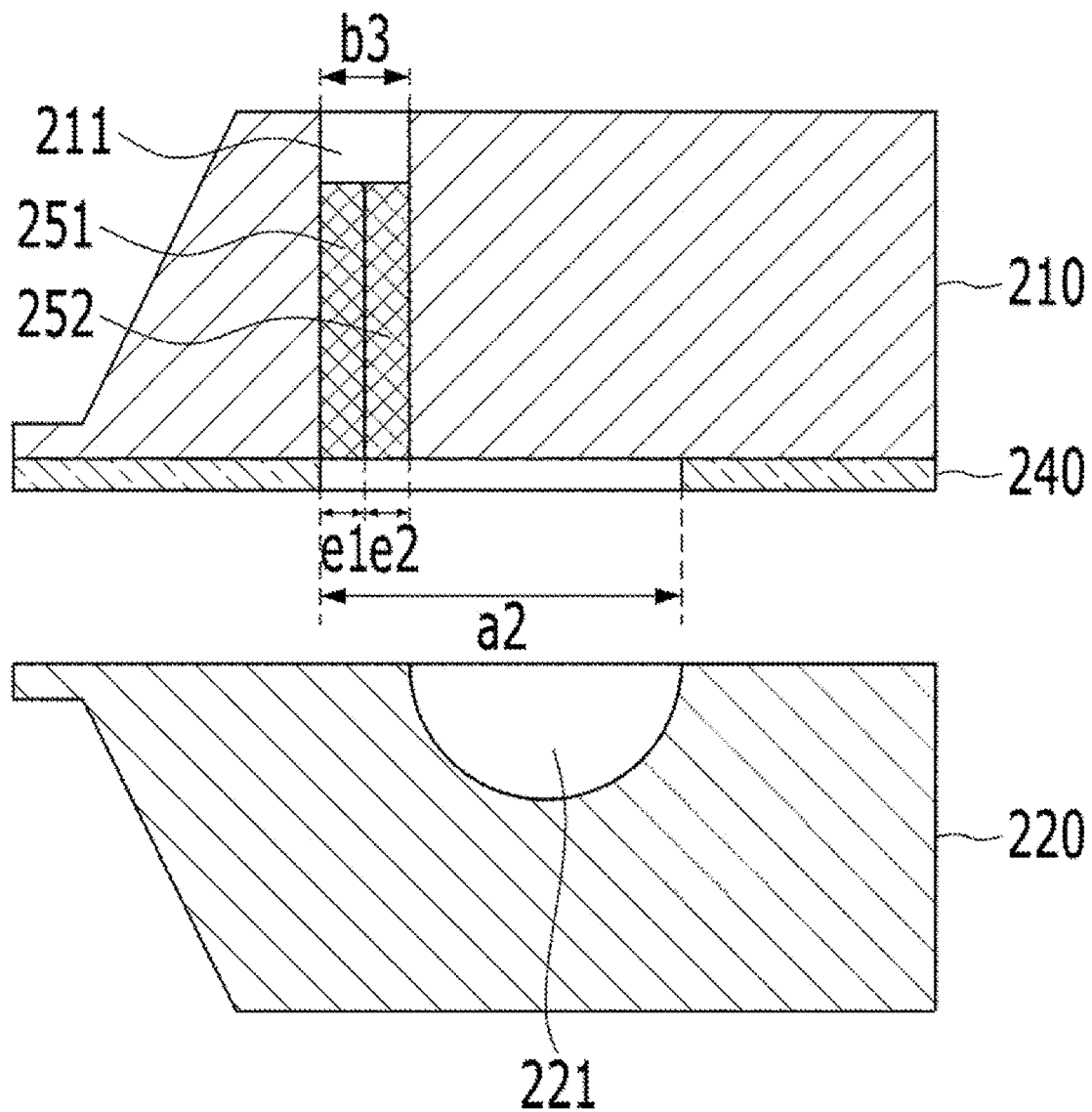

[FIG. 9]
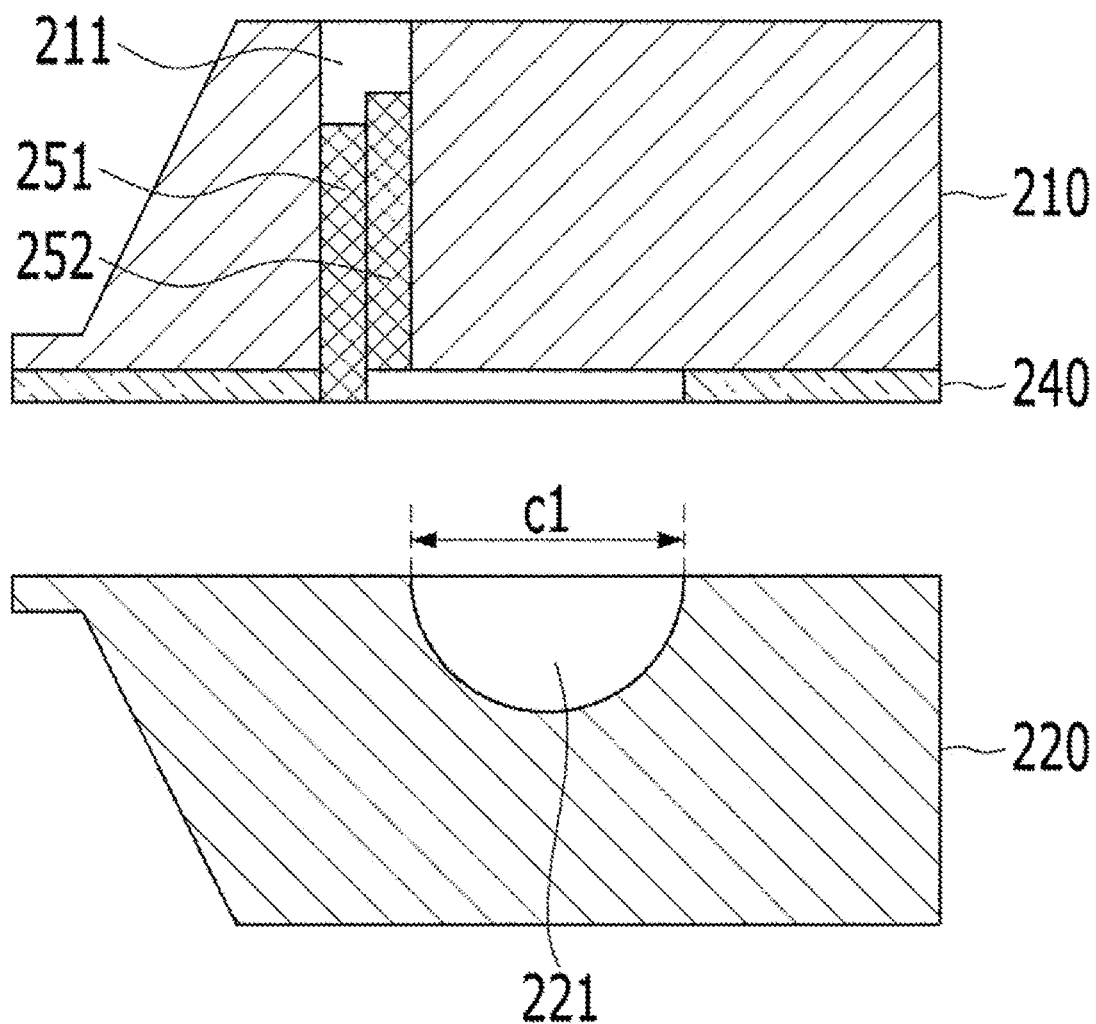

CHOKE BAR SLOT DIE AND SLURRY COATING APPARATUS INCLUDING THE SAME

TECHNICAL FIELD

This application claims the benefit of priority based on Korean Patent Application No. 10-2019-0113243, filed on Sep. 16, 2019, and the entire contents of the Korean patent application are incorporated herein by reference.

The present invention relates to a slot die including a choke bar in a die and a slurry coating apparatus including the same.

BACKGROUND ART

As technology development and demand for mobile devices have increased, a demand for secondary batteries as an energy source has rapidly increased, and recently, the use of secondary batteries as a power source for electric vehicles (EV) and hybrid electric vehicles (HEV) is being realized. Accordingly, many studies have been conducted on secondary batteries capable of meeting various demands. In particular, there is a high demand for lithium secondary batteries having high energy density, high discharge voltage and output stability.

In particular, since lithium secondary batteries used in electric vehicles should be able to be used for more than 10 years under severe conditions in which charging and discharging by large currents are repeated in a short time, as well as high energy density and characteristics that can exhibit large output in a short time, it is inevitably required to have superior safety and long-term life characteristics than a small lithium secondary battery.

In general, a secondary battery has a structure including an electrode assembly having a structure in which a positive electrode, a negative electrode, and a separator interposed between the positive electrode and the negative electrode are stacked. The positive electrode and the negative electrode are prepared by coating an electrode mixture containing an active material on a current collector.

At this time, the electrode mixture needs to be formed with a uniform thickness in the current collector in order to make the characteristics of the secondary battery uniform, and for this purpose, an electrode mixture coating device such as a die coater is used.

In this electrode mixture coating device, a slot die is formed to be long in one direction so that the electrode mixture can be applied relatively thinly over a large area.

As for the slot die, a coating solution is discharged through the gaps (slots) at the ends divided into two sides of the slot die, as the ink comes out of the tip of the pen, so that the slot die itself moves or the current collector moves, and the electrode mixture is applied to the current collector.

Korean Patent Publication No. 10-2016-0070482 discloses a die coater capable of forming a patterned coating layer. In this case, a coating pattern is formed by using a member such as a shim between the dies, but the number of non-coated parts and coated parts may be different depending on the shape of the shim.

However, since the slot die has a partition wall in the middle of the shim, it is difficult to control the size of the discharge port through a partition or the like to control the flow rate of the coating liquid due to the spatial limitation due to the partition wall, and a partition may need to be separately manufactured according to the shape of the shim.

DISCLOSURE

Technical Problem

The present invention has been invented to solve the above problems, and an object of the present invention is to provide a slot die forming a space in which a choke bar for adjusting a flow rate of a discharge port can move, and a slurry coating apparatus including the same.

Technical Solution

A slot die according to the present invention is a slot die having a slit-shaped discharge port in which a length of a discharge passage in a width direction based on a cross section of a discharge port is greater than a thickness perpendicular to the width direction, the slot die including: a lower body configured to form a lower surface of the discharge passage; an upper body configured to be disposed opposite the lower body to determine a thickness of the discharge passage and to have a slit-shaped through path formed in a width direction; a stripe shim configured to be positioned on the discharge passage of the slot die and to divide the discharge port in the width direction; a cover shim configured to be located on the stripe shim and to include a through hole formed in a central part; and a choke bar configured to open and close a part of the discharge passage of the slot die while moving in a direction perpendicular to the discharge direction through the through path of the upper body.

In one embodiment, a width direction length of the through path formed in the upper body may correspond to a width direction length of the choke bar.

A length in a discharge direction of the through path may correspond to a length in a discharge direction of the choke bar.

In another embodiment, N (N is an integer of 2 or more) choke bars may be arranged in the discharge direction.

At this time, a discharge direction length of the through path formed in the upper may correspond to a sum of discharge direction lengths of the N choke bars.

In one embodiment, the lower body may have an internal space recessed in a concave shape to accommodate the slurry.

In one embodiment, the stripe shim may have a plate material in which its center is empty and an outer peripheral portion of its discharge port is open.

Further, the stripe shim may have a bar-shaped partition wall for dividing the discharge port into a plurality of regions in the width direction (TD), the partition wall protruding toward the opened outer periphery.

There may be n partition walls (n is an integer of 1 or more), and the discharge passage of the discharge port may be divided into n+1 units in the width direction by the partition walls.

In one embodiment, the cover shim may have a plate-shaped structure, and shares the stripe shim and the discharge passage, and a length of the cover shim in the width direction may correspond to a length of the discharge passage in the width direction.

At this time, a thickness of the cover shim may be in a range of 20 to 80% of a thickness of the discharge passage.

Further, a thickness ratio of the stripe shim and the cover shim may be 3:1 to 1:3. Further, the cover shim may face the upper body, and the stripe shim may face the lower body.

At this time, a length of the through hole formed in the cover shim in a width direction may be the same as a length of the through path formed in the upper body in a width direction, and a discharge direction length of the through hole formed in the cover core may be greater than or equal to a sum of a discharge direction length of the through path and a discharge direction length of the internal space.

In addition, the present invention provides an electrode slurry coating apparatus including the slot die described above.

Advantageous Effects

According to a slot die and an apparatus for coating an electrode slurry including the same according to the present invention, by providing a cover shim on a stripe shim to form a space in which a choke bar die can move, it is possible to use a slot die including a choke bar in a batch shape for forming all kinds of active material patterns regardless of the design of the stripe shim.

BRIEF DESCRIPTION OF THE DRAWINGS

FIG. 1 is an exploded perspective view of a slot die according to an embodiment of the present invention.

FIG. 2 is a top view showing the shape of a stripe shim according to an embodiment of the present invention.

FIG. 3 is a top view showing the shape of a cover shim according to an embodiment of the present invention.

FIG. 4 is a top view showing a state of an upper die according to an embodiment of the present invention.

FIG. 5 is a vertical cross-sectional view in the width direction of a slot die according to an embodiment of the present invention.

FIG. 6 is a vertical cross-sectional view of a discharge direction of a slot die according to an embodiment of the present invention.

FIG. 7 is a vertical cross-sectional view showing the movement of a choke bar in a slot die according to an embodiment of the present invention.

FIG. 8 is a vertical cross-sectional view of a discharge direction of a slot die according to another embodiment of the present invention.

FIG. 9 is a vertical cross-sectional view showing the movement of a choke bar in a slot die according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In addition, in the present specification, the "discharge direction" refers to a direction in which an electrode slurry is discharged through a discharge port, and the "width direction" refers to the width direction of a slot die or the width direction of a coated electrode slurry, which is a direction perpendicular to the discharge direction.

The present invention relates to a slot die having a slit-shaped discharge port in which the length in the width direction of the discharge passage is greater than a thickness perpendicular to the width direction based on the cross section of the discharge port in order to coat the electrode slurry or the like.

A slot die according to the present invention includes: a lower body configured to form a lower surface of the discharge passage; an upper body configured to be disposed opposite the lower body to determine a thickness of the discharge passage and to have a slit-shaped through path formed in a width direction; a stripe shim configured to be positioned on the discharge passage of the slot die and to divide the discharge port in the width direction; a cover shim configured to be located on the stripe shim and to include a through hole formed in a central part; and a choke bar configured to open and close a part of the discharge passage of the slot die while moving in a direction perpendicular to the discharge direction through the through path of the upper body.

In this case, the upper body and the lower body are spaced apart at predetermined intervals through a shim to form a discharge passage, and the electrode slurry is introduced into the discharge passage through a slurry inflow passage (not shown) connected to the lower body and discharged through the discharge port.

In one embodiment, while the slurry is discharged from the discharge passage to the discharge port, the choke bar inserted into the through path of the upper body may move up and down in the through path to adjust the flow rate of the discharged slurry.

In addition, it is preferable that the width direction length of the through path formed in the upper body corresponds to the width direction length of the choke bar. If the length in the width direction of the through path is smaller than the length in the discharge direction of the choke bar, the up and down movement of the choke bar may not be smooth due to friction between the choke bar and the through path, and the choke bar may be damaged. On the other hand, when the length in the width direction of the through path is larger than the length in the width direction of the choke bar, the choke bar moves in the width direction while the choke bar moves up and down in the through path, so that the flow rate control of the slurry may not be uniform.

In addition, it is preferable that the length of the through path in the discharge direction corresponds to the length of the choke bar in the discharge direction. This is to prevent the slurry from flowing into the gap between the through path and the choke bar.

Further, it is preferable that the length of the choke bar in the width direction is the same as the length of the discharge port formed by the stripe shim in the width direction. When the length of the choke bar in the width direction is smaller than the length of the discharge port, a space is generated between the choke bar and the edge of the stripe shim, and the slurry is discharged through it, thereby reducing the precision of flow rate control.

Meanwhile, in the slot die, the lower body may have an internal space recessed in a concave shape so that the introduced slurry may be temporarily accommodated for uniform outflow of the slurry.

In yet another embodiment, N (N is an integer of 2 or more) choke bars may be arranged in the discharge direction. In this case, the length in the discharge direction of the through path formed in the upper body preferably corresponds to the sum of the lengths in the discharge direction of the N choke bars. When a plurality of choke bars are present, the length of each choke bar in the discharge direction may be appropriately set. However, it is preferable that the length of each choke bar in the discharge direction be the same for ease of flow control.

In addition, in the slot die according to the present invention, the stripe shim is a plate material in which the center portion is empty and the outer peripheral portion toward the discharge port is open, and the direction of the electrode slurry is adjusted to be discharged toward the open outer peripheral portion.

In one specific example, the stripe shim divides the discharge port into a plurality of regions in the width direction TD since the bar-shaped partition wall protrudes in the open outer periphery direction. That is, the electrode slurry flowing into the discharge passage through the slurry inflow passage and the lower body may be discharged only through the open portion by being blocked by the partition wall. As a result, a non-coated part is formed as much as the thickness of the partition wall, and the slurry discharged into the space between the partitions forms a coated part.

In the stripe shim, there are n partition walls (n is an integer greater than or equal to 1), and the discharge passage of the discharge port may be divided n+1 parts in the width direction by the partition walls. The length of the partition walls ribs in the width direction and the spacing between the partition walls may be appropriately adjusted according to the pattern shape of the electrode to be coated.

However, when the stripe shim as described above is used for pattern coating, the flow rate control by the choke bar may not be smooth as it is blocked in the space due to the partition wall as described above. To this end, if the shape of the choke bar is modified to match the shape of the stripe shim, it is difficult to apply it to various stripe shims, and the choke bar should be replaced whenever the coating pattern is changed.

In the present invention, the flow rate of the electrode slurry can be adjusted regardless of the shape of the stripe shim by securing a space for the choke bar to move up and down as much as the thickness of the cover shim using a cover shim including a through hole located on the stripe shim and formed in the central part together with the stripe shim. The cover shim is located between the stripe shim and the lower body and faces the lower body.

The cover shim has a plate-shaped structure, and shares the stripe shim and the discharge passage, and the width of the cover shim may correspond to the width direction of the discharge passage, that is, the length of the stripe shim in the width direction for assembling of the slot die and stable discharge of the slurry.

The thickness of the cover shim may be in the range of 20% to 80% of the thickness of the discharge passage formed between the upper body and the lower body, preferably in the range of 30% to 70%, and more preferably in the range of 40 to 60%. When the thickness of the cover shim is less than 20% of the thickness of the discharge passage, the thickness of the cover shim becomes too thin, so the effect of controlling the flow rate by the choke bar may be reduced. Conversely, when the thickness of the cover shim exceeds 80% of the thickness of the discharge passage, the thickness of the cover shim becomes thick and it is easy to control the flow rate, but the flow of electrode slurry is obstructed by the choke bar, making it difficult to uniformly coat.

In addition, the thickness ratio of the stripe shim and the cover shim may be 3:1 to 1:3, preferably 2:1 to 1:2. As described above, when the thickness ratio of the stripe shim and the cover shim exceeds the above range, the thickness of the cover shim becomes too thin, so that the effect of controlling the flow rate by the choke bar decreases, or the cover shim becomes too thick, so that uniform coating of the slurry may become difficult.

The through hole partially obstructs the flow of the slurry flowing through the discharge passage by the choke bar descending through the through path and inserted into the through hole, thereby controlling the flow rate of the slurry. Specifically, the choke bar descends by a predetermined distance within the through path, and one end thereof is positioned at a predetermined point in the space formed by the cover shim. When the choke bar is completely inserted into the through hole, the flow rate of the electrode slurry decreases compared to when the choke bar is partially inserted into the through hole.

In another embodiment, when there are a plurality of choke bars, each of the choke bars may operate independently. In this case, the flow rate of the slurry can be adjusted by the distance the choke bar has descended and the number of descended choke bars. As the number of descending choke bars increases, the flow of the slurry is more obstructed, and thus the flow rate of the slurry decreases.

In addition, it is preferable that the length of the through hole formed in the cover shim in the width direction is the same as the length of the through path formed in the upper body in the width direction. By matching the length of the through hole in the width direction, the length in the width direction of the through path, and the length in the width direction of the choke bar, the slurry is prevented from flowing to the edge of the choke bar.

In addition, the length in the discharge direction of the through hole may be greater than or equal to the sum of the length in the discharge direction of the through path formed in the upper body and the length in the discharge direction of the internal space formed in the lower body. When the length in the discharge direction of the through hole is less than the sum of the lengths in the discharge direction of the through path and the internal space, the size of the through hole becomes too small. As a result, the flow of the slurry flowing out of the internal space may be obstructed by the cover shim, and some of the slurry flows directly into the discharge port without adjusting the flow rate by the choke bar, thereby reducing the flow rate control efficiency.

In addition, the present invention provides an electrode slurry coating apparatus including the slot die described above. The electrode active material coating apparatus applies the electrode slurry discharged through the discharge port onto the current collector. The electrode slurry is agitated while the active material is mixed with a binder, a conductive agent, and a solvent in a mixer (not shown) to form a slurry, and the slurry may be filtered through a sieve or filter to increase dispersion and then transferred to a slot die.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, or aluminum or stainless steel of which the surface has been treated with carbon, nickel, titanium, silver, or the like. The current collector may have fine irregularities on the surface thereof to increase the adhesion of the positive electrode active material, and various forms such as a sheet, a foil, and a net are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a sheet, a foil, and a net.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M', Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0<x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

Hereinafter, the present invention will be described in more detail through drawings and examples.

FIG. 1 is an exploded perspective view of a slot die 100 according to an embodiment of the present invention, and FIGS. 2 to 4 are top views showing a stripe shim 130, a cover shim 140, and an upper die 110 according to an embodiment of the present invention. Referring to these drawings, the slot die 100 according to the present invention has a structure in which a stripe shim 130 and a cover shim 140 are mounted between an upper body 110 and a lower body 120. More specifically, the slot die 100 has a form in which the lower body 120, the stripe shim 130, the cover shim 140, and the upper body 110 are sequentially combined, and the cover shim 140 faces the upper body 110, and the stripe shim 130 faces the lower body 120. The discharge port portions of the upper body 110 and the lower body 120 protrude to form discharge lips 112 and 122. A choke bar (not shown) is inserted into the upper body 110 and a through path 111 is formed so as to move in a direction perpendicular to the discharge direction. In the lower body, an inflow passage (not shown) through which the slurry flows into the slot die and an internal space 121 for temporarily receiving the slurry are formed.

Stripe shim 130 has an empty center and an open outer peripheral portion of the discharge port, and its partition wall 131 protrudes in the direction of the open outer periphery. For example, FIG. 2 illustrates a case in which two partition walls 131 are formed.

The cover shim 140 shares the discharge passage with the stripe shim 130, and the overall sizes of the cover shim 140 and the stripe shim 130 are the same. The length of the cover shim 140 in the width direction corresponds to the length of the discharge passage in the width direction. A through hole 141 into which a choke bar can be inserted is formed in the cover shim, and the length a1 of the through hole 141 in the width direction is the same as the length b1 of the through path 111 in the width direction. In addition, the length b2 in the discharge direction of the through path 111 is equal to or greater than the length in the discharge direction of the choke bar. The choke bar is inserted into a partial region of the through hole 141 to control the flow rate of the slurry.

FIG. 5 is a vertical cross-sectional view in the width direction of a slot die according to an embodiment of the present invention.

Referring to FIG. 5, the discharge passage of the slot die 100 is formed in a space between the upper body 110 and the lower body 120. The cover shim 140 forming a space in which the choke bar can move and the stripe shim 130 forming the coating pattern are located in the discharge passage between the upper body and the lower body, and the discharge port 132 is formed between the stripe shim 130 and the lower body 120. The stripe shim 130 divides the discharge port 132 by the partition wall 131. In FIG. 5, the stripe shim 130 and the cover shim 140 have the same thickness (h, a3), and the thickness ratio of the cover shim is 50% of the thickness of the discharge passage.

First Embodiment

FIG. 6 is a vertical cross-sectional view of a discharge direction of a slot die according to an embodiment of the present invention, and FIG. 7 is a vertical cross-sectional view showing the movement of a choke bar in a slot die according to an embodiment of the present invention.

Referring FIGS. 6 and 7, the choke bar 150 is inserted into the through path in the upper body 110. FIGS. 6 and 7 show that the discharge direction length (a2) of the through hole formed in the cover shim 140 is equal to the sum of the discharge direction length (b2) of the through path and the discharge direction length (c1) of the internal space formed in the lower body (the stripe shim is not shown).

In order to reduce the flow rate of the slurry, the choke bar 150 descends along the through path 111 and is inserted into the through hole 141, and fills a partial area of the through hole 141. One end of the choke bar 150 is located at a predetermined point in the space formed by the cover shim 140, and the maximum distance that the choke bar 150 can move is the same as the thickness of the cover shim 140. When the choke bar 150 descends, the flow of the slurry is obstructed, and the flow rate of the slurry discharged to the discharge port decreases. The flow rate of the slurry may be adjusted by the falling distance of the choke bar 150 (or the position of the choke bar), and the larger the falling distance of the choke bar 150, the larger the flow rate of the slurry decreases.

Second Embodiment

FIG. 8 is a vertical cross-sectional view of a discharge direction of a slot die according to another embodiment of the present invention, and FIG. 9 is a vertical cross-sectional view showing the movement of a choke bar in a slot die according to another embodiment of the present invention.

Referring to FIGS. 8 and 9, a plurality of choke bars 251 and 252 may be inserted into the through path 211 in the upper body (FIGS. 8 and 9 show a shape in which two choke bars are inserted). In this case, the discharge direction length b3 of the through path 211 is equal to the sum of the discharge direction lengths e1 and e2 of respective choke bars. In addition, the length (a2) in the discharge direction of the through hole formed in the cover shim 240 is equal to the sum of the length (b3) in the discharge direction of the through path and the length (c1) in the discharge direction of the internal space formed in the lower body.

In order to reduce the flow rate of the slurry, all or part of the plurality of choke bars descends along the through path and is inserted into the through hole to fill a partial region of the through hole. Conversely, in order to increase the flow rate of the slurry, all or part of the choke bar rises along the through path. One end of the choke bar is located at a predetermined point in the space formed by the cover shim, and the maximum distance that the choke bar can move is the same as the thickness of the cover shim. When the choke bar descends, the flow of the slurry is obstructed, and the flow rate of the slurry discharged to the discharge port decreases. The flow rate of the slurry may be adjusted by the falling distance of the choke bar (or the position of the choke bar), and the larger the falling distance of the choke bar, the larger the flow rate of the slurry decreases.

In addition, the flow rate of the slurry can be adjusted not only by the descending distance of the choke bars but also by the number of descended choke bars. As the number of descending choke bars increases, the flow of the slurry is disturbed more, so the flow rate of the slurry decreases. In this case, the flow rate of the slurry will decrease more significantly when both choke bars descend than when one choke bar descends. The movement of the plurality of choke bars can be independently controlled.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

On the other hand, although terms indicating directions such as up and down have been used in the present specification, it is obvious to those skilled in the art that these terms are for convenience of description and may be expressed differently depending on the viewing position of the observer or the position of the object.

DESCRIPTION OF REFERENCE NUMERALS

100: slot die
110, 210: upper body
111, 211: through path
120, 220: lower body
121, 221: internal space
130, 230: stripe shim
131: partition wall
140, 240: cover shim
141: through hole
150, 251, 252: choke bar

The invention claimed is:
1. A slot die comprising:
a slit-shaped discharge port in which a length of a discharge passage in a width direction based on a cross section of the discharge port is greater than a thickness perpendicular to the width direction,
a lower body configured to form a lower surface of the discharge passage;
an upper body configured to form an upper surface of the discharge passage, the upper body being disposed opposite the lower body to determine the thickness of the discharge passage and to have a slit-shaped through path formed in the width direction;
a stripe shim configured to be positioned on the discharge passage of the slot die and to divide the discharge port in the width direction;

a cover shim configured to be located on the stripe shim and to include a through hole formed in a central part; and a choke bar configured to open and close a part of the discharge passage of the slot die while moving in a direction perpendicular to the discharge direction through the through path of the upper body, wherein the discharge direction is a direction in which a slurry is configured to be discharged through the discharge port, wherein the choke bar is perpendicular to the discharge direction along its longest axis, wherein the slit-shaped through path extends from an opening in an outer surface of the upper body to the upper surface of the discharge passage, and wherein an end of the choke bar is configured to travel along the slit-shaped through path from the opening in the outer surface of the upper body to the discharge passage.

2. The slot die of claim 1, wherein a width direction length of the through path formed in the upper body corresponds to a width direction length of the choke bar.

3. The slot die of claim 1, wherein a length in a discharge direction of the through path corresponds to a length in a discharge direction of the choke bar.

4. The slot die of claim 1, wherein N choke bars are arranged in the discharge direction and N is an integer of 2 or more.

5. The slot die of claim 4, wherein a discharge direction length of the through path formed in the upper body corresponds to a sum of discharge direction lengths of the N choke bars.

6. The slot die of claim 1, wherein the lower body has an internal space recessed in a concave shape to accommodate the slurry.

7. The slot die of claim 1, wherein the stripe shim is a plate material in which its center is empty and an outer peripheral portion of its discharge port is open.

8. The slot die of claim 7, wherein the stripe shim has a bar-shaped partition wall for dividing the discharge port into a plurality of regions in the width direction (TD), the partition wall protruding toward the open outer periphery.

9. The slot die of claim 8, wherein there the partition wall is present in an integer of 1 or more, and wherein the discharge passage of the discharge port is divided into n+1 units in the width direction by the partition walls.

10. The slot die of claim 1, wherein the cover shim has a plate-shaped structure, and shares the stripe shim and the discharge passage, and wherein a length of the cover shim in the width direction corresponds to a length of the discharge passage in the width direction.

11. The slot die of claim 1, wherein a thickness of the cover shim is in a range of 20 to 80% of the thickness of the discharge passage.

12. The slot die of claim 1, wherein a thickness ratio of the stripe shim and the cover shim is 3:1 to 1:3.

13. The slot die of claim 1, wherein the cover shim faces the upper body, and the stripe shim faces the lower body.

14. The slot die of claim 1, wherein a length of the through hole formed in the cover shim in a width direction is the same as a length of the through path formed in the upper body in a width direction, and wherein a discharge direction length of the through hole formed in a cover core is greater than or equal to a sum of a discharge direction length of the through path and a discharge direction length of an internal space.

15. An apparatus for coating an electrode slurry comprising a slot die according to claim 1.

* * * * *